(12) United States Patent
Biadsy et al.

(10) Patent No.: US 12,300,216 B2
(45) Date of Patent: May 13, 2025

(54) END-TO-END SPEECH CONVERSION

(71) Applicant: Google LLC, Mountain View, CA (US)

(72) Inventors: Fadi Biadsy, Mountain View, CA (US); Ron J. Weiss, New York, NY (US); Aleksandar Kracun, New York, NY (US); Pedro J. Moreno Mengibar, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 196 days.

(21) Appl. No.: 17/310,732

(22) PCT Filed: Nov. 26, 2019

(86) PCT No.: PCT/US2019/063334
§ 371 (c)(1),
(2) Date: Aug. 19, 2021

(87) PCT Pub. No.: WO2020/171868
PCT Pub. Date: Aug. 27, 2020

(65) Prior Publication Data
US 2022/0122579 A1  Apr. 21, 2022

Related U.S. Application Data

(60) Provisional application No. 62/808,627, filed on Feb. 21, 2019.

(51) Int. Cl.
G10L 13/02     (2013.01)
G06N 3/08      (2023.01)
(Continued)

(52) U.S. Cl.
CPC ........... G10L 13/02 (2013.01); G06N 3/08 (2013.01); G10L 13/027 (2013.01); G10L 13/08 (2013.01);
(Continued)

(58) Field of Classification Search
None
See application file for complete search history.

(56) References Cited

U.S. PATENT DOCUMENTS

2016/0093289 A1   3/2016  Pollet
2016/0171387 A1*  6/2016  Suskind ............... G10L 13/033
                                                        706/12
(Continued)

FOREIGN PATENT DOCUMENTS

JP   S63-231495 A   9/1988
JP   2005266349 A   9/2005
(Continued)

OTHER PUBLICATIONS

Alexander Kain, John-Paul Hosom, Xiaochuan Niu, Jan P.H. van Santen, Melanie Fried-Oken, Janice Staehely; Improving the intelligibility of dysarthric speech; Apr. 18, 2007; URL:https://www.sciencedirect.com/science/article/pii/S0167639307000854 (Year: 2007).*

(Continued)

Primary Examiner — Richa Sonifrank
(74) Attorney, Agent, or Firm — Honigman LLP; Brett A. Krueger; Grant Griffith

(57) ABSTRACT

Methods, systems, and apparatus, including computer programs encoded on a computer storage medium, for end to end speech conversion are disclosed. In one aspect, a method includes the actions of receiving first audio data of a first utterance of one or more first terms spoken by a user. The actions further include providing the first audio data as an input to a model that is configured to receive first given audio data in a first voice and output second given audio data in a synthesized voice without performing speech recognition on the first given audio data. The actions further include receiving second audio data of a second utterance of the one or more first terms spoken in the synthesized voice. The (Continued)

actions further include providing, for output, the second audio data of the second utterance of the one or more first terms spoken in the synthesized voice.

14 Claims, 6 Drawing Sheets

(51) Int. Cl.
| | |
|---|---|
| *G10L 13/027* | (2013.01) |
| *G10L 13/08* | (2013.01) |
| *G10L 15/06* | (2013.01) |
| *G10L 21/003* | (2013.01) |
| *G10L 21/04* | (2013.01) |
| *G10L 21/10* | (2013.01) |
| *G10L 25/18* | (2013.01) |
| *G10L 25/30* | (2013.01) |
| *H04L 51/02* | (2022.01) |

(52) U.S. Cl.
CPC .......... *G10L 15/063* (2013.01); *G10L 21/003* (2013.01); *G10L 21/04* (2013.01); *G10L 21/10* (2013.01); *G10L 25/18* (2013.01); *G10L 25/30* (2013.01); *H04L 51/02* (2013.01)

(56) References Cited

U.S. PATENT DOCUMENTS

| | | | |
|---|---|---|---|
| 2018/0174595 A1* | 6/2018 | Dirac | G10L 21/013 |
| 2019/0130896 A1 | 5/2019 | Zhou et al. | |
| 2019/0318722 A1* | 10/2019 | Bromand | G10L 15/063 |

FOREIGN PATENT DOCUMENTS

| | | | |
|---|---|---|---|
| JP | 2008058696 A | 3/2008 | |
| JP | 2019008120 A | 1/2019 | |
| WO | 2008142836 A1 | 11/2008 | |

OTHER PUBLICATIONS

Albert Haque, Michelle Guo, Prateek Verma; Conditional End-to-End Audio Transforms; Sep. 2018 URL: https://www.isca-speech.org/archive/pdfs/interspeech_2018/haque18_interspeech.pdf (Year: 2018).*
International Search Report for the related Application No. PCT/US2019/063334, dated Mar. 10, 2020, 89 pages.
Albert Haque et al: "Conditional End-to-End Audio Transforms", arxiv.org, Cornell University Library, 201 Olin Library Cornell University Ithaca, NY 14853, Mar. 30, 2018 (Mar. 30, 2018), XP081236600.
Kain et al: "Improving the intelligibility of dysarthric speech", Speech Communication, Elsevier Science Publishers, Amsterdam, NL, vol. 49, No. 9, Jul. 24, 2007 (Jul. 24, 2007), pp. 743-759, XP022165860, ISSN: 0167-6393, DOI: 10.1016/J.SPECOM.2007.05.001, p. 744, left-hand column, line 24-l ine 36 p. 744, right-hand column, l ine 3-l ine 18 section 3.1.
Jaime Lorenzo-Trueba et al: "The Voice Conversion Challenge 2018: Promoting Development of Parallel and Nonparallel Methods", arxiv .org, Cornell University Library, 201 Olin Library Cornell University Ithaca, NY 14853, Apr. 12, 2018 (Apr. 12, 2018), XP080870000, sections 2.1, 2.2.
Toru Nakashika et al: "Non-Parallel Training in Voice Conversion Using an Adaptive Restricted Boltzmann Machine", IEEE/ACM Transactions on Audio, Speech, and Language Processing, IEEE, USA, vol. 24, No. 11, Nov. 1, 2016 (Nov. 1, 2016), pp. 2032-2045, XP058309779, ISSN: 2329-9290, DOI:10.1109/TASLP.2016.2593263, abstract, section III.
Wu Zhizheng et al: "Conditional restricted Boltzmann machine for voice conversion", 2013 IEEE China Summit and International Conference on Signal and Information Processing, IEEE,Jul. 6, 2013 (Jul. 6, 2013), p. 104 108, XP032501204, DOI: 10.1109/CHINASIP.2013.6625307 [retrieved on Oct. 8, 2013], sections 2.1, 2.2.
Hirokazu Kameoka et al: "ConvS2S-VC: Fully convolutional sequence-to-sequence voice conversion", arxiv.org, Cornell University Library, 201 Olin Library Cornell University Ithaca, NY 14853, Nov. 5, 2018 (Nov. 5, 2018} ,XP081046005, abstract p. 2, left-hand column, last paragraph section 3.2 figure 1.
Mimura Masato et al: "Leveraging Sequence-to-Sequence Speech Synthesis for Enhancing Acoustic-to-Word Speech Recognition", 2018 IEEE Spoken Language Technology Workshop (SLT), IEEE, Dec. 18, 2018 (Dec. 18, 2018), pp. 477-484, XP033517003, DOI: 10.1109/SLT.2018.8639589 [retrieved on Feb. 11, 2019], section 4.1.
Ye Jia et al: "Leveraging Weakly Supervised Data to Improve End-to-End Speech-to-Text Translation", arxiv.org, Cornell University Library, 201 Olin Library Cornell University Ithaca, NY 14853, Nov. 5, 2018 (Nov. 5, 2018} ,XP081046429, section 4.
Fadi Biadsy et al: "Parrotron:An End-to-End Speech-to-Speech Conversion Model and its Applications to Hearing-Impaired Speech and Speech Separati on 11 , arxiv .org, Cornell University Library, 201 Olin Library Cornell University Ithaca, Ny 14853, Apr. 8, 2019 (Apr. 8, 2018); XP081515314, sections 2, 3.1 p. 2, right-hand column, last paragraph.
Japan Patent Office. Office Action relating to application No. JP 2021-549246, dated Sep. 30, 2022.
Chinese Office Action for the related Application No. 202180036340.8, dated Jul. 29, 2023, 6 pages.
Shaub, David: "Fast and accurate yearly time series forecasting with Forecast combinations", International Journal of Forecasting, vol. 36, Issue 1, pp. 116-120, published on Mar. 31, 2020, 5 pages.
Office Action issued in related Japanese Patent Application No. 2023-036090, dated Apr. 16, 2024.
Office Action issued in related Korean Patent Application No. 10-2023-7041230, dated Jan. 17, 2025.

* cited by examiner

END-TO-END SPEECH CONVERSION

CROSS-REFERENCE TO RELATED APPLICATION

This application claims the benefit of U.S. Application 62/808,627, filed Feb. 21, 2019, which is incorporated by reference.

TECHNICAL FIELD

This specification generally relates to speech processing.

BACKGROUND

Speech processing is the study of speech signals and the processing methods of signals. The signals are usually processed in a digital representation, so speech processing can be regarded as a special case of digital signal processing, applied to speech signals. Aspects of speech processing includes the acquisition, manipulation, storage, transfer and output of speech signals.

SUMMARY

Speech synthesizers typically require a transcription as an input. A speech synthesizer receives a transcription and outputs audio data of a synthesized utterance of the transcription. In order to convert a user's speech to a synthesized utterance, an automated speech recognizer would have to perform automated speech recognition on the audio data of the user's speech to generate a transcription of the user's speech. The speech synthesizer would then generate a synthesized utterance of the transcription of the user's speech.

This technique of performing automated speech recognition and speech synthesis may be taxing on a computing system. It would be beneficial to have a process that is capable of converting speech audio received from a user to speech audio in a voice other than the voice of the user without the need to perform automated speech recognition on the user's speech. The discussion below describes a process of using a model trained using machine learning to convert speech audio in the voice of a speaker to speech audio in a different voice without performing speech recognition. The model receives the speech audio spoken by the speaker and converts the speech audio to a mathematical representation. The model converts the mathematical representation to speech audio in a different voice without performing speech recognition on the speech audio spoken by the speaker.

In some implementations, a speech synthesis system is able to convert first audio data including an utterance in a first voice into second audio data that includes the same utterance in a second voice. The conversion can be done by acting directly on samples or features of the first audio data, without converting the audio to an intermediate representation (e.g., text, phones, etc.). The system can use a sequence-to-sequence to normalize arbitrary speech, potentially including background noise, and generate the same content in the voice of a single predefined target speaker. The source speech can be from any speaker or accent, and may contain complex prosodic patterns, imperfections, and background noise, all of which are removed through the normalization process as the first audio data is converted into clean second audio data with a fixed accent and consistent articulation and prosody. In other words, the system may be used to project away all non-linguistic information, including speaker characteristics, and to retain only what is been said, not who, how, or where it is said.

This type of normalization has multiple potential applications. Fully normalizing any voice to a single speaker with clean audio could significantly simplify speech recognition models, which could be reduced to supporting a single speaker. Removing the identity of the speaker might be useful when logging sensitive and private speech data, allowing users to transmit only converted speech to servers erased of 'acoustic' identity. Reducing all accents into a single voice with a predefined accent may also alleviate biases and discrimination while maintaining a natural human voice as opposed to acoustically masked audio, for example, for phone interviews or recorded candidate talks given to hiring committees. Another application would be to facilitate the understanding of speech content of accents that are foreign to the listener, i.e. improving intelligibility of heavily accented speech.

According to an innovative aspect of the subject matter described in this application, a method for end to end speech conversion includes the actions of receiving, by a computing device, first audio data of a first utterance of one or more first terms spoken by a user; providing, by the computing device, the first audio data as an input to a model that is configured to receive first given audio data of a first given utterance of one or more first given terms spoken in a first voice and output second given audio data of a second given utterance of the one or more first given terms spoken in a synthesized voice without performing speech recognition on the first given audio data; in response to providing the first audio data as an input to the model, receiving, by the computing device, second audio data of a second utterance of the one or more first terms spoken in the synthesized voice; and providing, for output by the computing device, the second audio data of the second utterance of the one or more first terms spoken in the synthesized voice.

These and other implementations can each optionally include one or more of the following features. The actions further include receiving, by the computing device, data indicating that a bot that is configured to conduct conversations with a given human is not configured to generate a response to a third utterance received from a human; and, based on receiving the data indicating that the bot is not configured to generate the response to the third utterance received from the human, transmitting, by the computing device and to a human operator, a request to respond to the third utterance received from the human. The action of receiving the first audio data of the first utterance of the one or more first terms spoken by the user includes receiving the first audio data of the first utterance of the one or more first terms spoken by the human operator in response to the third utterance. The action of receiving the first audio data of the first utterance of the one or more first terms spoken by the user includes receiving the first audio data of the first utterance of the one or more first terms spoken by the user while answering a telephone call.

The actions further include receiving audio data of collection of utterances; obtaining a transcription of each utterance in the collection of utterances; providing the transcriptions of each utterance as an input to a text to speech model; receiving, for each transcription of each utterance, audio data of an additional collection of utterances in a synthesized voice; and training the model using the audio data of the collection of utterances and the audio data of an additional collection of utterances in a synthesized voice. The actions further include receiving, by the computing device, third audio data of a third utterance of one or more third terms spoken by an additional user; providing, by the computing device, the third audio data as an input to the model; in response to providing the third audio data as an input to the model, receiving, by the computing device, fourth audio data of a fourth utterance of the one or more third terms spoken in the synthesized voice; and providing, for output by the computing device, the fourth audio data of the fourth utterance of the one or more third terms spoken in the synthesized voice. The actions further include bypassing, by the computing device, obtaining a transcription of the first utterance. The model is configured to adjust a time period between each of the one or more first given terms. The model is configured to adjust a speaking time of each of the one or more first given terms.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. A computing system is able to receive audio data of an utterance spoken in a voice of a user and output audio data of a synthesized utterance spoken in a synthesized voice without the added overhead of performing automated speech recognition on the received audio data.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
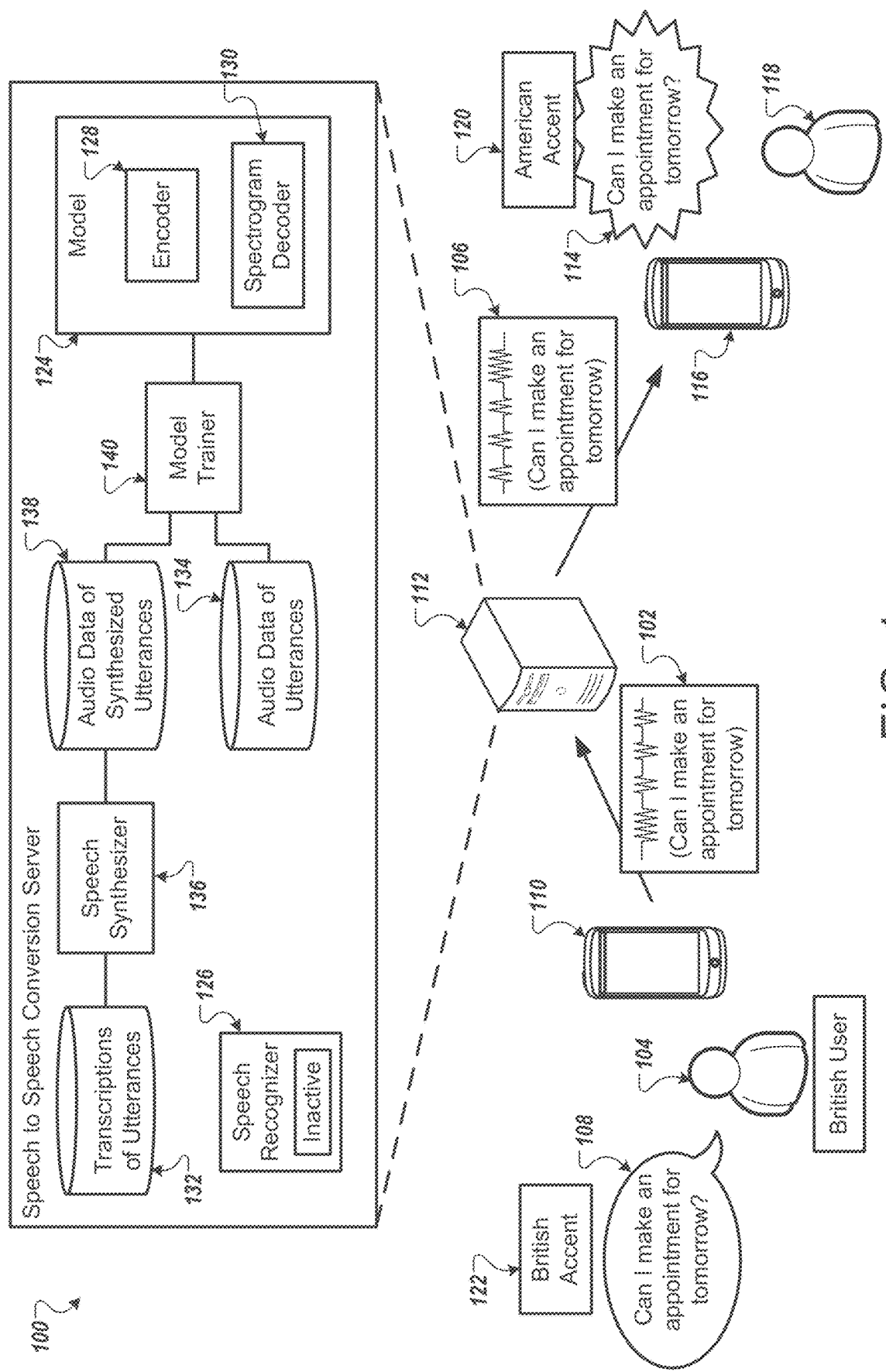
FIG. 1 illustrates an example system that converts speech audio received from a user to synthesized speech audio without performing speech recognition.

FIG. 1 illustrates an example system 100 that converts speech audio 102 received from a user 104 to synthesized speech audio 106 without performing speech recognition. Briefly, and as described in more detail below, the user 104, who speaks with a British accent speaks the utterance 108 in the vicinity of the computing device 110. The computing device 110 transmits the audio data 102 of the utterance 108 to the speech to speech conversion server 112. The speech to speech conversion server 112 converts the audio data 102 of the utterance 108 to audio data 106 of a synthesized utterance 114. The speech to speech conversion server 112 transmits the audio data 106 of the synthesized utterance 114 to computing device 116, and the computing device 116 outputs the synthesized utterance 114. In some implementations, the functionality of the end to end speech conversion server 112 is built into the computing device 110 or the computing device 116 or both.

In more detail, the user 104 and the user 118 are speaking with each other through computing device 110 and computing device 116. The user 104 and the user 118 may be speaking over a telephone call or another type of voice communication protocol, for example, voice over internet protocol. While the user 104 and the user 118 may speak the same language, it may be difficult for user 118 to understand user 104 because user 104 has a thick accent. In this example, the user 104 may be British, and the user 118 may have an easier time understanding an American accent 120 than the British accent 122 of user 104.

To address this problem, the computing device 110 may provide audio data 102 of the utterance 108 and other utterances spoken by the user 104 to the speech to speech conversion server 112. The speech to speech conversion server 112 may be configured to convert audio data of an utterance spoken by a user who may speak with an accent into audio data of a synthesized utterance that may have a different accent. To accomplish this conversion, a server would typically be configured to perform speech recognition on the audio data of the utterance spoken by the user with the accent. The speech recognizer may be configured to recognize speech spoken in the accent of the user or may be configured to recognize speech spoken in any accent. The server would then provide the transcription to a speech synthesizer that would generate audio data of synthesized speech with a different accent. The speech to speech conversion server 112 operates in a different manner.

The speech to speech conversion server 112 receives the audio data 102 of the utterance 108 from the computing device 110 and provides the audio data 102 of the utterance 108 to the model 124. The speech to speech conversion server 112 trains the model 124 to convert the audio data 102 of the utterance 108 spoken in a British accent 122 to audio data 106 of the synthesized utterance 114 in an American accent 120. The speech to speech conversion server 112 does not use a speech recognizer 126 to perform this conversion. The speech recognizer 126 may remain inactive during the conversion process. Instead, the model 124 provides the audio data 102 of the utterance 108 to an encoder 128. The encoder 128 may be configured to convert the audio data 102 of the utterance 108 to an internal representation, such as a series of vectors. For example, as the encoder 128 receives the audio data 102 of the utterance 108, the encoder 128 may process five frames of audio and convert those five frames of audio to ten vectors. The vectors are not a transcription of the frames of audio data 102, but rather a mathematical representation of the frames of the audio data 102. The model 124 provides the series of vectors to the spectrogram decoder 130. The spectrogram decoder 130 may be configured to generate audio data of a synthesized utterance based on the vectors received from the encoder 128. For example, the spectrogram decoder 130 may receive the ten vectors from the encoder 128 that represent the five frames of audio. The spectrogram decoder 130 generates five frames of audio data 106 of the synthesized utterance 114 that includes the same words or parts of words as the five frames of audio data, but with a different voice than the user 104.

The speech to speech conversion server 112 provides the audio data 106 of the synthesized utterance 114 to the computing device 116. In the example shown in FIG. 1, the speech to speech conversion server 112 provides audio data 106 of the synthesized utterance of "Can I make an appointment for tomorrow?" The synthesized utterance 114 may have an American accent 120. In some implementations, the synthesized utterance 114 may have the same accent of the user 104 and a different voice than the user 104. The voice of the synthesized utterance 114 may be such that the user 118 or another user would be unable to identify the user 104 as the speaker of the utterance 108. In some implementations, the cadence of the synthesized utterance 114 may be different than the cadence of utterance 108. The speech to speech conversion server 112 may adjust the cadence of the synthesized utterance 114 to increase the likelihood that the user 118 would be able to understand the synthesized utterance 114.

The computing device 116 receives the audio data 106 of the synthesized utterance 114 and outputs the audio data 106 through a speaker or other audio output device. In some implementations, the speech to speech conversion server 112 continuously generates portions of the synthesized utterance 114 as the user 104 speaks the corresponding portions of the utterance 108. For example, the speech to speech conversion server 112 may generate one second of the synthesized utterance 114 after receiving one second of the utterance 108. By continuously generating portions of the synthesized utterance 114, the conversation between user 104 and 118 may be more naturally paced. In some implementations, the speech to speech conversion server 112 may determine when the user 104 has stopped speaking. After determining that the user 104 has stopped speaking, the speech to speech conversion server 112 converts the audio data 102 of the utterance 108 to the audio data 106 of the synthesized utterance 114.

The speech to speech conversion server 112 includes various components to generate the training data and to train the model 124. The speech to speech conversion server 112 includes transcriptions of utterances 132 and audio data of the utterances 134. The utterances may be utterances spoken by different users with different types of accents. In some implementations, the transcriptions of utterances 132 are generated by an automated speech recognizer. The speaker of each utterance may verify the accuracy of the transcription before the transcription is stored in the transcriptions of utterances 132 and the audio data is stored in the audio data of the utterances 134. In some implementations, the transcriptions of utterances 132 are generated by one or more people.

The speech to speech conversion server 112 provides the transcriptions of utterances 132 to a speech synthesizer 136. The speech synthesizer is configured to generate audio data of synthesized utterances 138 of the transcriptions 132. The speech synthesizer may be configured to generate the audio data of synthesized utterances 138 in a single voice. The voice may have a particular accent such as an American accent or a British accent. The audio data of synthesized utterances 138 may be free of any background noise or other audio artifacts.

The speech to speech conversion server 112 provides the audio data of synthesized utterances 138 and the audio data of utterances 134 to the model trainer 140. The model trainer 140 trains the model 124 using machine learning techniques. The model trainer 140 trains the model 124 to receive audio data similar to the audio data of utterances 134 and output audio data similar to the audio data of synthesized utterances 138 without performing speech recognition on the received audio data. The model trainer 140 trains the model 124 to output utterances in the same voice as the synthesized utterances from the speech synthesizer 136 even when the model 124 receives different inputs that include audio data of different utterances in different voices.

In some implementations, the speech to speech conversion server 112 may use audio data of utterances 134 that include different audio characteristics. This may result in a model 124 that is configured to handle an input of audio data that has those different characteristics. In some implementations, the speech to speech conversion server 112 may add audio characteristics to the audio data of utterances 134 so that the model trainer 140 trains the model 124 to handle audio characteristics similar to the added audio characteristics.

For example, the speech to speech conversion server 112 may add varying levels of noise to the audio data of utterances 134. The varying levels of noise can include different types of noise such as stationary noise and/or non-stationary noise. The stationary noise can include varying levels of road noise, varying levels of background speech noise similar to a cocktail party or restaurant, varying levels of fan noise, and/or any other similar type of noise. The non-stationary noise can include varying levels of television noise, varying levels of wind gust noise, varying levels of background music noise, and/or any other similar type of noise. The speech to speech conversion server 112 may add different levels and different types of noise to audio data of the same utterance. This may result in multiple audio data samples that match a same transcription with each audio data sample including the same underlying utterance audio data with different levels and different types of noise added. With the addition of noise, the model 124 may be better configured to process received audio data that include background noise in addition to the audio data of the utterance.

As another example, the speech to speech conversion server 112 may process audio data of utterances 134 from users who may have speech impediments that cause the use to speak with disfluencies, such as those users with amyotrophic lateral sclerosis. The model trainer 140 may train the model 124 using audio data of utterances from users with speech impediments and transcriptions of the utterances so that the model 124 is able to receive audio data of an utterance spoken by a user with a speech impediment and output audio data of an utterance with a more consistent cadence that may be easier for another user to understand.

As another example, the speech to speech conversion server 112 may be configured to translate an utterance into a different language without transcribing the utterance. In this instance, the audio data of the utterances 134 may include utterances spoken in a first language, such as English. The transcriptions of the utterances 132 may include a transcription of the translation of the utterance in a second language, such as a Spanish translation. The speech synthesizer 136 may be configured to generate synthesized speech in the second language, such as synthesized Spanish utterances. The model trainer 140 trains the model 124 using the audio data of the utterances 134 in the first language and the audio data of the synthesized utterances 138 in the second language using machine learning. The resulting model 124 is configured to receive audio data of an utterance in a first language, e.g., English, and output audio data of a synthesized utterances in a second language, e.g., Spanish without transcribing the received utterance.

Figure 2:
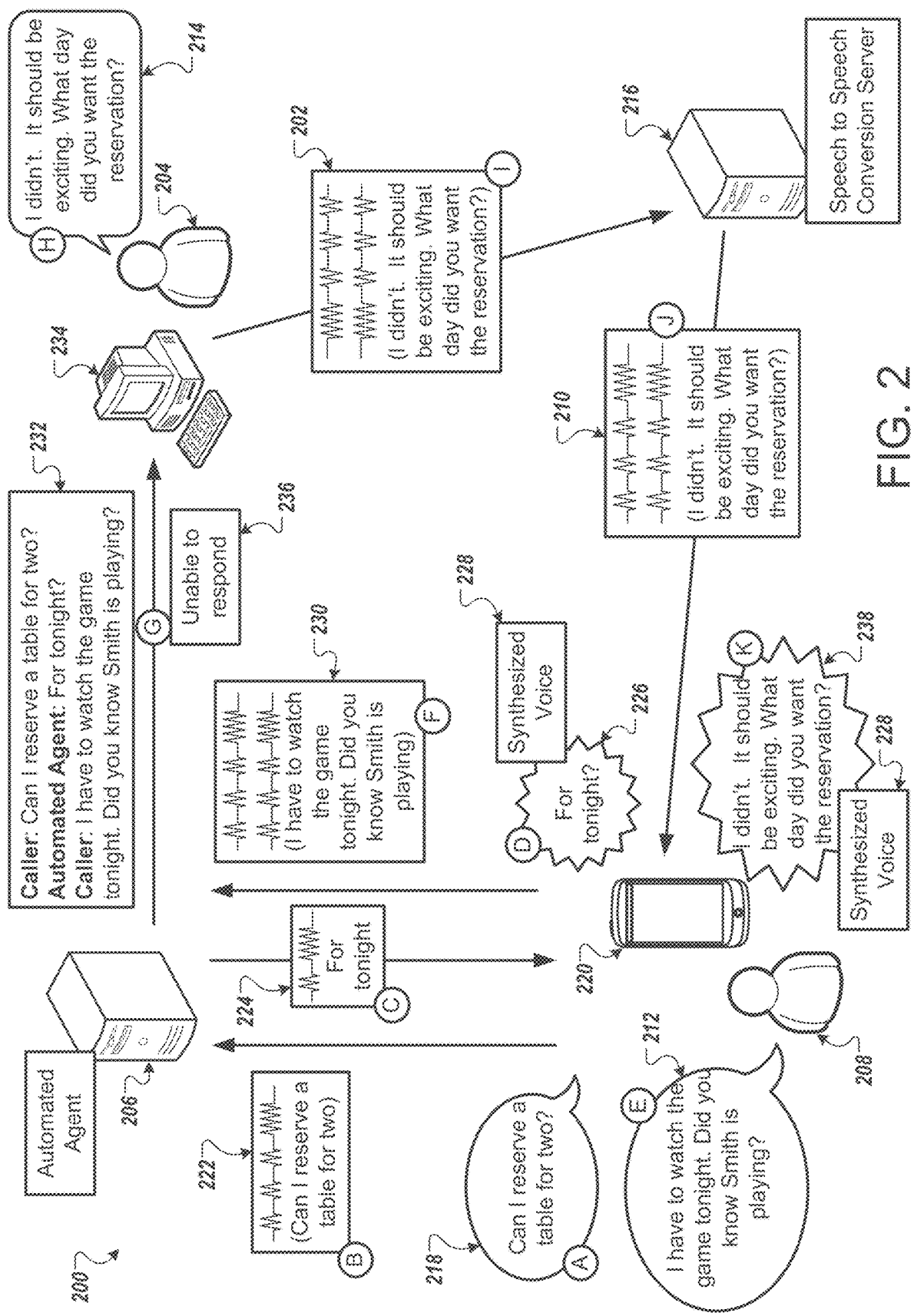
FIG. 2 illustrates an example system that converts speech audio received from an operator who is interrupting a conversation between an automated bot and a user to speech audio that imitates the automated bot.

FIG. 2 illustrates an example system 200 that converts speech audio 202 received from an operator 204 who is interrupting a conversation between an automated agent 206 and a user 208 to speech audio 210 that imitates the automated agent 206. Briefly, and as described in more detail below, the user 208 is conducting a conversation with the automated agent 206. During the conversation, the user 208 speaks an utterance 212 to which the automated agent 206 is unable to respond. The operator 204 receives an indication that the automated agent 206 is unable to respond to the utterance 212. The operator 204 provides an utterance 214 to respond to the utterance 212. The speech to speech conversion server 216 converts the speech audio 202 of the utterance 214 to the voice of the automated agent 206 so that the user 208 is under the impression that the user 208 is still conversing with the same party. In some implementations, the functionality of the automated agent 206 is built into the computing device 220 or the computing device 234 or both. In some implementations, the functionality of the end to end speech conversion server 216 is built into the computing device 220 or the computing device 234 or both.

In more detail and in stage A, the user 208 initiates a telephone conversation with the automated agent 206. The computing device 220 connects with the automated agent 206. The user speaks utterance 218 and asks the automated agent, "Can I reserve a table for two." The automated agent 206 may imitate a person such that the user 208 is unable to distinguish the automated agent 206 from an actual person. In some implementations, the automated agent 206 may initiate the telephone conversation with the user 208. In some implementations, the conversation between the user 208 and the automated agent 206 may be a communication channel other than a telephone call such as a VOIP call or other type of voice communication.

In stage B, the computing device 220 detects the utterance 218 through a microphone or another input device and processes the audio data of the utterance 218 using an audio subsystem. The audio subsystem may include the microphone, an analog to digital converter, a buffer, and various other audio filters. The microphone may be configured to detect sounds in the surrounding area such as speech, e.g., the utterance 218. The analog to digital converter may be configured to sample the audio data detected by the microphone. The buffer may store the sampled audio data for processing by the computing device 220 or for transmission by the computing device 220. In some implementations, the audio subsystem may be continuously active or may be active during times when the computing device 220 is expecting to receive audio such as during a telephone call. In this case, the microphone may be detect audio in response to the initiation of the telephone call with the automated agent 206. The analog to digital converter may be constantly sampling the detected audio data during the telephone call. The buffer may store the latest sampled audio data such as the last ten seconds of sound. The computing device 220 may provide the sampled and filtered audio data 222 of the utterance 218 to the automated agent 206.

The automated agent 206 receives the audio data 222 of the utterance 218 and determines an appropriate response. The automated agent 206 may apply a series of rules, decision trees, neural network, and/or another decision process to determine an appropriate response. The automated agent 206 may generate a transcription of an appropriate response and provide the transcription to a speech synthesizer. In stage C, the speech synthesizer may generate audio data 224 that represents the utterance 226, "For tonight?" as a response to "Can I reserve a table for two?" While a speech synthesizer may generate the utterance 226, the user 208 may be unable to determine that the user 208 is speaking to a computer.

In stage D, the computing device 226 receives the audio data 224 of the utterance 226. The computing device 226 outputs the audio data 224 through a speaker or other type of audio output device. The user 208 hears the utterance 226 in the synthesized voice 228.

In stage E, the user 208 responds to the utterance 226 by speaking utterance 212, "I have to watch the game tonight. Did you know that Smith is playing?" The computing device 220 detects the utterance 226 and processes the utterance 226 using the audio subsystem. In stage F, the computing device 220 provides the audio data 230 of the utterance 212 to the automated agent 206.

The automated agent 206 receives the audio data 230 of the utterance 212. The automated agent 206 processes the audio data 230 of the utterance 212 in a similar fashion to processing the audio data 222 of the utterance 218. The automated agent 206 may apply a series of rules, decision trees, neural network, and/or another decision process to determine an appropriate response to the utterance 212. In this instance, the automated agent 206 is unable to determine an appropriate response. The automated agent 206 may be unable to determine an appropriate response to a user utterance in instances where the user utterance is off topic from the conversation.

In order to continue the conversation, the automated agent 206 may notify an operator 204 who is standing by to assist when the automated agent 206 or other automated agents are unable to generate an appropriate response to a user utterance 212. In stage G, the automated agent 206 generates a summary 232 of the conversation between the automated agent 206 and the user 208. The summary 232 may consist of a transcript of the conversation up to the point where the automated agent 206 was unable to generate appropriate response to a user utterance 212. Alternatively or additionally, the summary 232 may consist of a description of any tasks accomplished as a result of the conversation or agreements made between the automated agent 206 and the user 208. In the example of FIG. 2, the summary 232 consists of a transcript of the conversation between the automated agent 206 and the user 212. The automated agent 206 may also include the status 236 of the conversation. The status 236 may describe the task that the automated agent 206 was unable to perform. The status 236 may indicate that the automated agent 206 was unable to perform speech recognition on the audio data 230 of the utterance 212. In that case, the summary 232 would include the audio data 230 of the utterance 212. The status 236 may indicate that the automated agent was unable to generate a response to the utterance 212.

In stage H, the computing device 234 of the operator 204 receives the summary 232 and the status 236. The operator 204 reviews the summary 232 and the status 236. The operator 204 speaks utterance 214 as a response to the utterance 238 of the user 208 and an attempt to steer the conversation back to the original topic or to a topic that that automated agent 206 is likely to understand. The computing device 234 detects the utterance 214 and processes the utterance 214 using an audio subsystem in a similar fashion to the computing device 220 processing utterance 212 and utterance 218. In the example shown in FIG. 2, the user 204 speaks," I didn't. It should be exciting. What day did you want the reservation?"

In stage I, the computing device 234 transmits the audio data 202 of the utterance 214 to the speech to speech conversion server 216. The speech to speech conversion server 216 may be similar to the speech to speech conversion server 112 in that the speech to speech conversion server 216 is configured to receive audio data of an utterance spoken in a first voice and output audio data of an utterance that includes the same words and terms spoken in a second, different voice without performing speech recognition on the audio data of the utterance spoken in the first voice. The speech to speech conversion server 216 may be configured to generate audio data of utterances in the same synthesized voice 228 as the automated agent 206.

In stage J, the speech to speech conversion server 216 converts the audio data of utterance 214 to the audio data 210 of utterance 238. The speech to speech conversion server 216 transmits the audio data 210 of utterance 238 to the computing device 220. In some implementations, the speech to speech conversion server 216 transmits the audio data 210 of utterance 238 to the computing device 234. The computing device 234 then transmits the audio data 210 of utterance 238 to the automated agent 206. The automated agent transmits the audio data 210 of utterance 238 to the computing device 220. In some implementations, the speech to speech conversion server 216 transmits the audio data 210 of utterance 238 to the automated agent 206. The automated agent transmits the audio data 210 of utterance 238 to the computing device 220. In some implementations, the computing device 234 provides a transcription of the utterance 214 to the automated agent 206 so the automated agent remains aware of the content of the conversation with the user 208. The automated agent 206 may use the transcription of the utterance 214 to update the model and/or rules used by the automated agent 206 to generate responses.

In stage K, the computing device 220 outputs the utterance 238 through a speaker or another type of audio output device. The user 208 hears the utterance 238 and because the utterance 238 is in the same synthesized voice 228 as the utterance 226, the user 208 is unaware that another party is participating in the conversation. The user 208 may respond to the utterance 238 by speaking a new utterance. The operator 204 may continue to monitor the conversation to ensure that the automated agent 206 is able to seamlessly take over the conversation. If necessary, the operator 204 can continue to speak with the user 208 through the speech to speech conversion server 216 for the remainder of the conversation or for a portion of the remaining conversation. During the conversation, the user 208 may be under the impression that the user 208 is speaking to the same real person.

Figure 3:
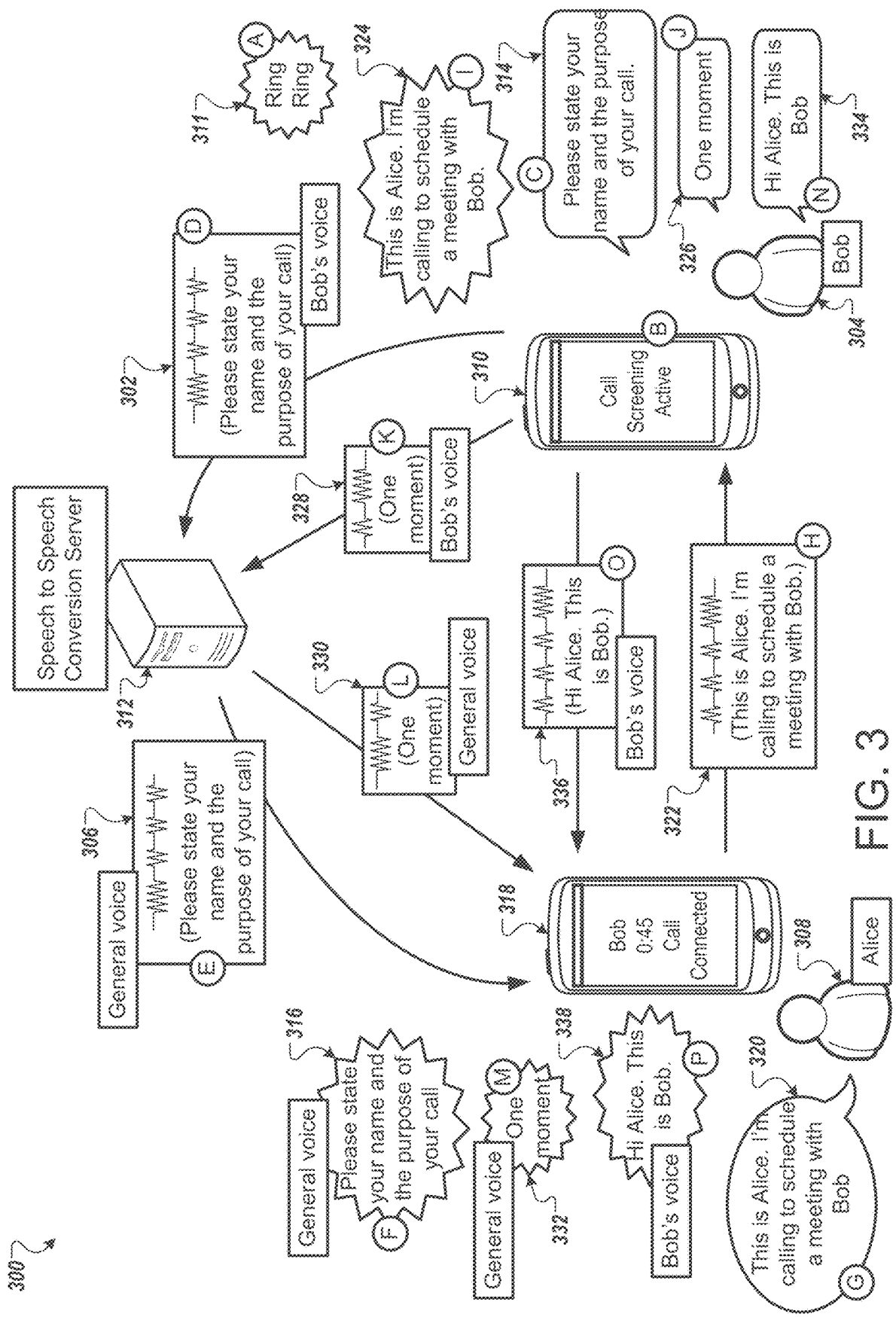
FIG. 3 illustrates an example system that converts speech audio received from a callee screening a call to speech audio that prevents the caller from determining that the callee answered the call.

FIG. 3 illustrates an example system 300 that converts speech audio 302 received from a callee 304 screening a call to speech audio 306 that prevents the caller 308 from determining that the callee 304 answered the call. Briefly, and as described in more detail below, the caller 308 places a telephone call to the callee 304. The callee 304 may be unsure about taking the call, but instead of letting the call go to voicemail, the callee 304 answers and screens the call. The callee 304 may use a call screening feature of the computing device 210 that accesses a speech to speech conversion server 312. The speech to speech conversion server 312 converts the audio data 302 of the utterance 314 spoken in the callee's voice to audio data 306 of the synthesized utterance 316 spoken in a general voice. The caller 308 answers the screening question unaware that the callee 304, and perhaps an actual person, answered the call. In some implementations, the functionality of the end to end speech conversion server 312 is built into the computing device 310 or the computing device 318 or both.

In more detail and in stage A, the caller 308, Alice, initiates a telephone call with the callee 304, Bob. The computing device 310 indicates that the computing device 310 is receiving an incoming call by outputting a notification 311. Instead of a telephone call, the caller 308 may initiate a voice communication over an alternate type of communication channel such as VOIP or similar type of voice communication. The caller 308 may initiate the telephone call from computing device 318. The computing device 310 of the callee 304 indicates that the callee 304 is receiving a telephone call. The computing device 310 may give the callee 304 the option of answering the telephone call directly, ignoring the telephone call, sending the telephone call to voicemail, or initiating call screening.

In stage B, the callee 304 initiates the call screening option. Upon selection of the call screening option, the computing device 310 initiates communication with the speech to speech conversion server 312. The computing device 310 indicates that the computing device 310 will send the speech to speech conversion server 312 audio data for conversion to another voice.

In stage C, the callee 304 speaks utterance 314. The computing device 310 detects the utterance 314 through a microphone or another type of audio input device and processes the audio data using an audio subsystem. The audio subsystem may include the microphone, an analog to digital converter, a buffer, and various other audio filters. The microphone may be configured to detect sounds in the surrounding area such as speech, e.g., the utterance 314. The analog to digital converter may be configured to sample the audio data detected by the microphone. The buffer may store the sampled audio data for processing by the computing device 310 or for transmission by the computing device 310. In some implementations, the audio subsystem may be continuously active or may be active during times when the computing device 310 is expecting to receive audio such as during a telephone call. In this case, the microphone may be detect audio in response to the initiation of the call screening option. The analog to digital converter may be constantly sampling the detected audio data during the telephone call. The buffer may store the latest sampled audio data such as the last ten seconds of sound. The computing device 310 may provide the sampled and filtered audio data 302 of the utterance 314 to the speech to speech conversion server 312 in stage D.

The speech to speech conversion server 312 receives the audio data 302 of the utterance 314 spoken by the callee 304 from the computing device 310. In some implementations, the computing device 310 provides instructions to the speech to speech conversion server 312 to convert the audio data 302 of the utterance 314 spoken by the callee 304 to an utterance spoken in a different voice. In some implementations, the computing device 310 provides instructions for where the speech to speech conversion server 312 should send the audio data 306 of the synthesized utterance 316 spoken in the different voice. For example, the computing device 310 may provide a phone number or a device identifier for computing device 318 and instructions to transmit the audio data 306 of the synthesized utterance 316 spoken in the different voice. In some implementations, the computing device 310 may provide instructions to the speech to speech conversion server 312 to transmit the audio data 306 of the synthesized utterance 316 spoken in the different voice back to the computing device 310 so that the computing device can transmit the audio data 306 of the synthesized utterance 316 spoken in the different voice to the computing device 318.

In stage E, the speech to speech conversion server 312 generates the audio data 306 of the synthesized utterance 316 spoken in the different voice that the voice of the callee 304. The speech to speech conversion server 312 may be similar to the speech to speech conversion server 112 in that the speech to speech conversion server 312 is configured to receive audio data of an utterance spoken in a first voice and output audio data of an utterance that includes the same words and terms spoken in a second, different voice without performing speech recognition on the audio data of the utterance spoken in the first voice. In this example, the speech to speech conversion server 312 receives audio data 302 of utterance 314 spoken in the voice of the callee 304. The speech to speech conversion server 312 provides the audio data 302 of utterance 314 spoken in the voice of the callee 304 to a model that generates, without performing speech recognition on the audio data 302, the audio data 306 of the utterance 316 spoken in a general voice that sounds like an actual person and does not sound like the callee 304. The speech to speech conversion server 312 provides the audio data 306 of the utterance 316 to the computing device 318. In some implementations, the speech to speech conversion server 312 provides the audio data 306 of the utterance 316 to the computing device 310 and the computing device 310 provides the audio data 306 of the utterance 316 to the computing device 318

In stage F, the computing device 318 outputs the audio data 306 of the utterance 316 through a speaker or other audio output device of the computing device 318. The utterance 316 is not in the voice of the callee 304 but rather in a different general voice that sounds like an actual person and does not sound like the callee 304. In the example of FIG. 3, the caller 308 hears, "Please state your name and the purpose of your call" in a voice that does not sound like the callee 304. The caller 308 may be under the impression that the caller 308 is conversing with a secretary or assistant of the callee 304.

In stage G, the caller 308 responds to utterance 316 by speaking utterance 320. The utterance 320 is detected by a microphone or other audio input device of the computing device 318. An audio subsystem of the computing device 318 processes the utterance 320. In the example of FIG. 3, the caller 308 says, "This is Alice. I'm calling to schedule a meeting with Bob."

In stage H, the computing device 318 transmits the audio data 322 of the utterance 320 to the computing device 310. The call screening feature of this example may work in one direction. In other words, with the call screening feature disguises the voice of the callee 304 who activated the call screening feature. The voice of the caller 308 remains unchanged.

In stage I, the computing device 310 outputs the audio data 322 of the utterance 320 through a speaker or other audio output device of the computing device 310. The utterance 320 is in the voice of the caller 308. The callee 304 hears, "This is Alice. I'm calling to schedule a meeting with Bob" in the voice of the caller 308.

In stage J and with call screening still active, the callee 304 speaks utterance 326. The utterance 326 is detected by the microphone or other audio input device of the computing device 310. The audio subsystem of the computing device 310 processes the utterance 326. In the example of FIG. 3, the callee 304 says, "One moment."

In stage K and with call screening still active, the computing device 310 transmits the audio data 328 of the utterance 326 to the speech to speech conversion server 312. The speech to speech conversion server 312 provides the audio data 328 of the utterance 326 to the same model as in stage D. The model generates the audio data 330 of the utterance 332 in a voice other than the voice of the callee 304. In some implementations, the voice of the utterance 332 is the same as the voice of the utterance 316. The speech to speech conversion server 312 generates the audio data 330 of the utterance 332 without performing speech recognition on the audio data 328.

In stage L, the speech to speech conversion server 212 provides the audio data 330 of the utterance 332 to the computing device 318. In some implementations, the speech to speech conversion server 312 provides the audio data 330 of the utterance 332 to the computing device 310 and the computing device 310 provides the audio data 330 of the utterance 332 to the computing device 318.

In stage M, the computing device 318 outputs the audio data 330 of the utterance 332 through the speaker or other audio output device of the computing device 318. The utterance 332 is not in the voice of the callee 304 but rather in the same general voice as the utterance 316 or another voice that sounds like an actual person. In the example of FIG. 3, the caller 308 hears, "One moment" in a voice that does not sound like the callee 304. The caller 308 may continue to be under the impression that the caller 308 is conversing with a secretary or assistant of the callee 304.

In stage N, the callee 304 speaks utterance 334. The utterance 334 is detected by the microphone or other audio input device of the computing device 310. The audio subsystem of the computing device 310 processes the utterance 334. In the example of FIG. 3, the callee 304 says, "Hi Alice. This is Bob." Before speaking the utterance 334, the callee 304 may deactivate the call screening mode of the computing device 310. The callee 304 may deactivate the call screening mode anytime during execution of stages K, L, or M and before stage N. By deactivating call screening mode, the computing device 310 returns to transmitting audio data of utterances spoken by the callee 304 to the computing device 318 instead of transmitting audio data of utterances spoken by the callee 304 to the speech to speech conversion sever 312. In some implementations, the computing device 310 provides an indication to the speech to speech conversion sever 312 that the computing device 310 will not transmit audio data of subsequently received utterances to the speech to speech conversion sever 312 for converting to a different voice.

In stage O and with call screening inactive, the computing device 310 transmits the audio data 336 to the computing device 318. This audio data transmission may be similar to an audio data transmission that happens during a typical voice conversation between two users using computing devices similar to computing device 310 and computing device 318.

In stage P, the computing device 318 outputs the utterance 338 through the speaker or other audio output device of the computing device 318. In the example of FIG. 3, the computing device 318 outputs the utterance 338, "Hi Alice. This is Bob." The voice of the utterance 338 is the voice of the callee 304. The caller 308 is likely under the impression that the person who screened the call transferred the call to the callee 304 and that the caller 308 was not speaking with the callee 304 during the entire call.

Figure 4:
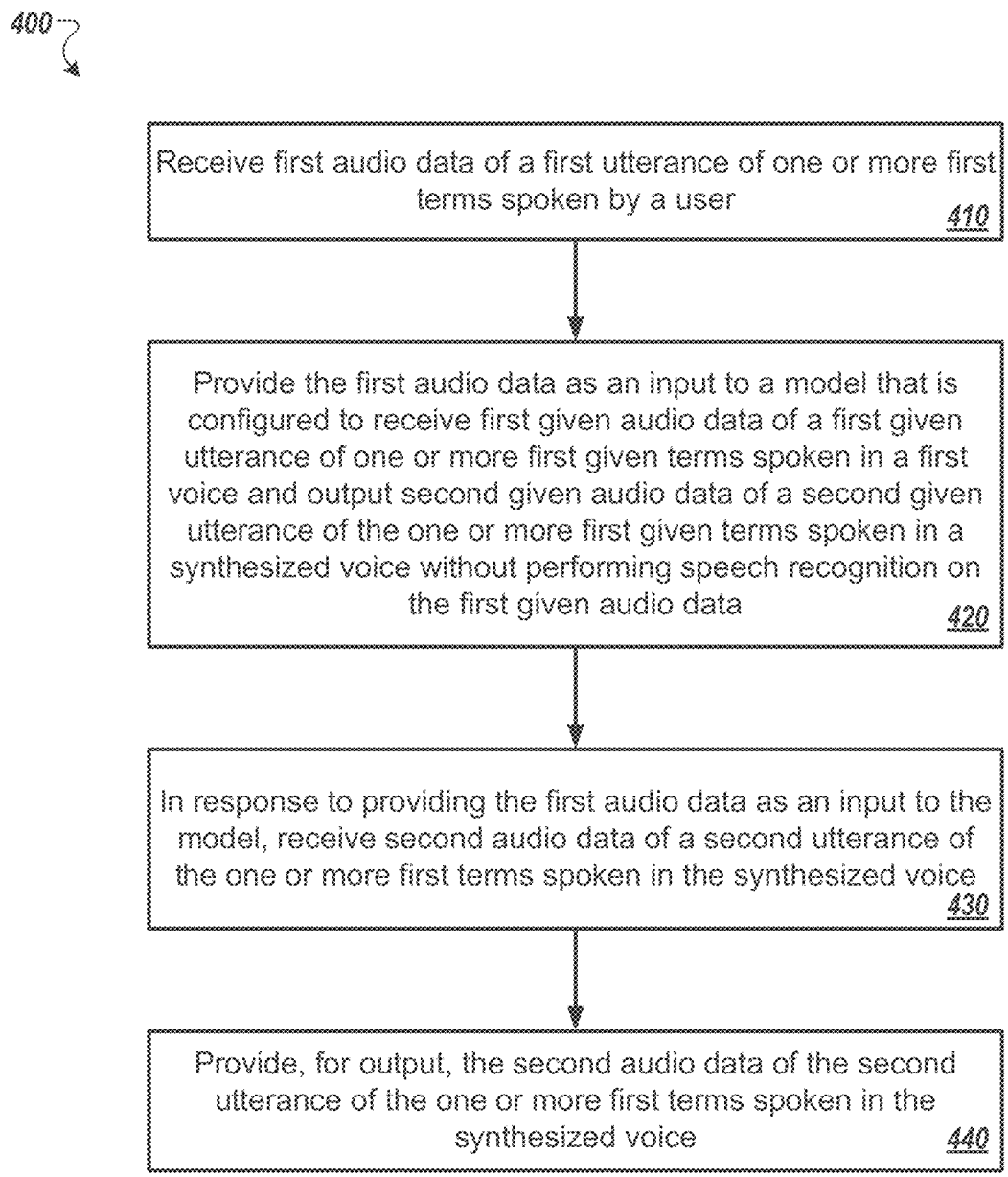
FIG. 4 is a flowchart of an example process for converting speech audio received from a user to synthesized speech audio without performing speech recognition.

FIG. 4 is a flowchart of an example process 400 for converting speech audio received from a user to synthesized speech audio without performing speech recognition. In general, the process 400 receives audio data of an utterance that is spoken by a user. The process 400 converts the audio data of the utterance to audio data of another utterance in a different voice by applying the audio data of the utterance to a model. The different voice is a synthesized voice that sounds like an actual person. A person listening to the other utterance in the different voice may not realize that the original user spoke the utterance before conversion to the different voice. The process 400 generates the audio data of the other utterance in the different voice without performing speech recognition on the received audio data. The process 400 outputs the audio data of the other utterance in the different voice. The process 400 will be described as being performed by a computer system comprising one or more computers, for example, the system 100 of FIG. 1, the system 200 of FIG. 2, or the system 300 of FIG. 3.

The system receives first audio data of a first utterance of one or more first terms spoken by a user (410). The user may speak in the typical voice of the user. In some implementations, the user speaks the first utterance while answering a telephone call. In some implementations, the user may activate a call screening feature of the system before answering the telephone call.

The system provides the first audio data as an input to a model that is configured to receive first given audio data of a first given utterance of one or more first given terms spoken in a first voice and output second given audio data of a second given utterance of the one or more first given terms spoken in a synthesized voice without performing speech recognition on the first given audio data (420). The model may use an encoder to encode the first audio data into a series of vectors that represent the audio data. The vectors may be different than a transcription of the first audio data. The model may use a decoder to generate the outputted audio data. The decoder may be configured to convert the vectors to synthesized speech in a voice that is different than the voice of the user. In some implementations, the model bypasses transcribing the first audio data of the first utterance.

The system, in response to providing the first audio data as an input to the model, receives second audio data of a second utterance of the one or more first terms spoken in the synthesized voice (430). In some implementations, the speaking time of each of the one or more first terms in the first utterance may be different than the speaking time of each of the one or more first terms in the second utterance. In some implementations, the time periods between each of the one or more first terms in the first utterance may be different than the time periods between each of the one or more terms in the second utterance.

The system provides, for output, the second audio data of the second utterance of the one or more first terms spoken in the synthesized voice (440). The system may output the second audio data to a speaker or other audio output device. Another user may hear the second utterance and may be unaware that original user spoke the first utterance. The second utterance may sound like the voice of an actual person even though the system generated the audio data of the second utterance using the model. In some implementations, the synthesized voice may have gender-neutral qualities such that a listener may not be able to determine whether the speaker is a male or a female. The pitch of a gender-neutral synthesized voice may be an average of the pitch for a female synthesized voice and the pitch for a male synthesized voice.

In some implementations, the system may receive an utterance from a different user. The system may apply the audio data of the utterance from the different user to the model. The model may output audio data of a synthesized utterance in the same synthesized voice. In other words, the model may be configured to convert audio data of utterances spoken by different people to utterances in the same synthesized voice.

In some implementations, the system may train the model using a collection of utterances received by the system and by other systems. The system obtains a transcription of each utterance in the collection of utterances. The system may generate the transcriptions using automated speech recognition or by manual transcription. The system provides each transcription to a speech synthesizer, or text to speech model, that generates the synthesized utterances in a synthesized voice. The system trains the model using machine learning and the collection of utterances and the corresponding synthesized utterances. The trained model is configured to generate a synthesized utterance in the same synthesized voice based on receiving an utterance spoken by a user. The trained model does not use speech recognition to generate the synthesized utterance.

In some implementations, the system may be part of an automated agent, or bot, that is configured to conduct voice conversations with a user. The user may be under the impression that instead of speaking to a computer, the user is speaking with a live person. The automated agent may not be able to generate an appropriate response to every utterance that the automated agent may receive from the user. In this instance, an operator may be standing by to jump in for the automated agent to generate a response to a user utterance so that the conversation can continue. The system may assist in disguising the voice of the operator so that the user is under the impression that the user is still speaking to the same person. The system may convert the voice of the operator to the voice of the automated agent so that the user hears the same voice even when the operator generates the response instead of the automated agent.

In more detail, this document describes an end-to-end speech-to-speech model that maps an input spectrogram directly to another spectrogram, without any intermediate discrete representation. The network is composed of an encoder, a spectrogram decoder, and a phoneme decoder, followed by a vocoder to synthesize a time-domain waveform. This model can be trained to normalize speech from any speaker even for speech that includes accents, emotions, complex prosodic patterns, imperfections, and background noise, into the voice of a clean single predefined target speaker with a fixed accent and consistent articulation and prosody. This document describes the impact of this approach on speech recognition performance. Moreover, this document demonstrates that the same architecture can be trained on a speech separation task. In some implementations, the end-to-end speech-to-speech model can translate Spanish speech into synthesized English speech.

Encoder-decoder models with attention may be used in modeling a variety of complex sequence-to-sequence problems. These models may be used for speech and natural language processing, such as machine translation, speech recognition, and combined speech translation. The models may also be used in end-to-end Text-To-Speech (TTS) synthesis and Automatic Speech Recognition (ASR), using a single neural network that directly generates the target sequences, given virtually raw inputs.

This document describes combining state of the art speech recognition and synthesis models to build a direct end-toend speech-to-speech sequence transducer which generates a speech spectrogram as a function of a different input spectrogram, without depending on an intermediate discrete representation. The model may first be applied to voice normalization and speech separation tasks. This model can be used to directly translate one language to another, for example, from Spanish speech into English speech.

In some implementations, a unified sequence-to-sequence model may normalize arbitrary speech, potentially including background noise, and generate the same content in the voice of a single predefined target speaker. The source speech can be from any speaker or accent, contain complex prosodic patterns, imperfections, and background noise, all of which are converted into a clean signal with a fixed accent and consistent articulation and prosody. The task is to project away all non-linguistic information, including speaker characteristics, and to retain only what is been said, not who, how, or where it is said.

Such a normalization system has multiple potential applications. Fully normalizing any voice to a single speaker with clean audio could simplify ASR models, which could be reduced to supporting a single speaker. Removing the identity of the speaker might be useful when logging sensitive and private speech data, allowing users to transmit only converted speech to servers erased of "acoustic" identity. Reducing all accents into a single voice with a predefined accent may also alleviate biases and discrimination while maintaining a natural human voice as opposed to acoustically masked audio, for example, for phone interviews or recorded candidate talks given to hiring committees. Another application would be to facilitate the understanding of speech content of accents that are foreign to the listener, e.g., improving intelligibility of heavily accented speech.

In some implementations, voice conversion may include using mapping code books, neural networks, dynamic frequency warping, and Gaussian mixture models. These techniques may modify only the input speaker's voice. In some implementations, voice conversion may include accent conversion. The models described in this document may normalize all speakers to a single voice and accent, as well as normalize prosody and use an end-to-end neural architecture that directly generates a target signal. In some implementations, voice conversion may be a filtering and/or transformation based approach.

The end-to-end sequence-to-sequence model architecture takes an input source speech and generates/synthesizes target speech as output. In some implementations, the only training requirement of such a model is a parallel corpus of paired input-output speech utterances.

Figure 5:
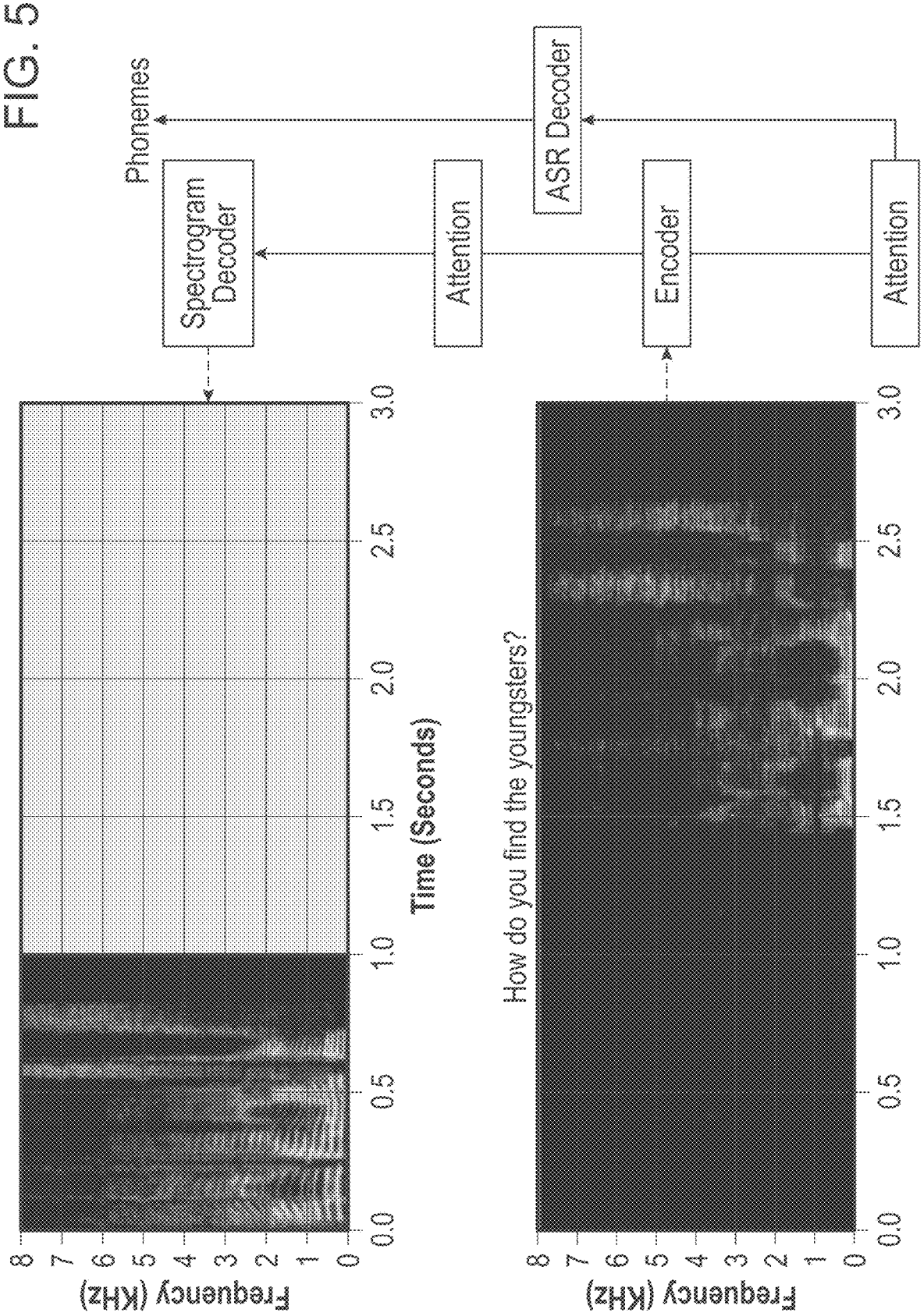
FIG. 5 illustrates an example network architecture of a system that converts speech audio received from a user to synthesized speech audio that has a higher pitch and faster speaking rate than the user without performing speech recognition

As shown in FIG. 5, the network is composed of an encoder and a decoder with attention, followed by a vocoder to synthesize a time-domain waveform. The encoder converts a sequence of acoustic frames into a hidden feature representation which the decoder consumes to predict a spectrogram. In some implementations, the core architecture of this model includes an attention-based end-to-end ASR model and/or end-to-end TTS models.

The base encoder configuration may be similar to other encoders with some variations discussed below. From an example input speech signal sampled at 16 kHz, the encoder may extract 80-dimensional log-mel spectrogram acoustic feature frames over a range of 125-7600 Hz, calculated using a Hann window, 50 ms frame length, 12.5 ms frame shift, and 1024-point Short-Time Fourier Transform (STFT).

In this example, the input features are passed into a stack of two convolutional layers with ReLU activations, each consisting of 32 kernels shapes 3×3 in time×frequency, and strided by 2×2, downsampling in time by a total factor of 4, decreasing the computation in the following layers. Batch normalization is applied after each layer.

The resulting downsampled sequence is passed into a bidirectional convolutional LSTM (CLSTM) layer using a 1×3 filter, e.g., convolving only across the frequency axis within each time step. Finally, this is passed into a stack of three bidirectional LSTM layers of size 256 in each direction, interleaved with a 512-dimension linear projection, followed by batch normalization and ReLU activation, to compute the final 512-dim encoder representation.

In some implementations, the decoder's targets are 1025 dimensional STFT magnitudes, computed with the same framing as the input features, 2048-point STFT.

The system uses the decoder network comprised of an autoregressive RNN to predict the output spectrogram from the encoded input sequence one frame at a time. The prediction from the previous decoder time step is first passed through a small pre-net containing two fully connected layers of 256 ReLU units, which may help to learn attention. The pre-net output and attention context vector may be concatenated and passed through a stack of two unidirectional LSTM layers with 1024 units. The concatenation of the LSTM output and the attention context vector is then projected through a linear transform to produce a prediction of the target spectrogram frame. Finally, these predictions are passed through 5-layer convolutional post-net which predicts a residual to add to the initial prediction. Each post-net layer has 512 filters shaped 5×1 followed by batch normalization and tanh activation.

To synthesize an audio signal from the predicted magnitude spectrogram, the system uses the Griffin-Lim algorithm to estimate a phase consistent with the predicted magnitude, followed by an inverse STFT. In some implementations, neural vocoders such as WaveNet may produce improved synthesis quality. In some implementations, WaveNet could replace Griffin-Lim.

In some implementations, the system may be configured to generate speech sounds instead of arbitrary audio. Jointly training the encoder network to simultaneously learn a high level representation of the underlying language serves to bias the spectrogram decoder predictions toward a representation of the same underlying speech content. An auxiliary ASR decoder may be added to predict the (grapheme or phoneme) transcript of the output speech, conditioned on the encoder latent representation. Such a multitask trained encoder can be thought of as learning a latent representation of the input that maintains information about the underlying transcript, e.g., one that is closer to the latent representation learned within a TTS sequence-to-sequence network.

In some implementations, the decoder input is created by concatenating a 64-dimensional embedding for the grapheme emitted at the previous time step, and a 512-dimensional attention context vector. This is passed into a 256 unit LSTM layer. Finally, the concatenation of the attention context and LSTM output is passed into a softmax layer which predicts the probability of emitting each grapheme in the output vocabulary.

The speech-to-speech model may be used to convert speech from an arbitrary speaker to use the voice of a predefined canonical speaker. As discussed above, the system may require a parallel corpus of utterances spanning a variety of speakers and recording conditions, each mapped to speech from a canonical speaker. Since it may be impractical to have a single speaker record hours of utterances in clean acoustic environment, a TTS system may be used to generate training targets from a large hand or machine transcribed corpus of speech. Essentially, this reduces the task to reproducing any input speech in the voice of a single-speaker TTS system. There are multiple advantages of using a TTS system to generate this parallel corpus: (1) the audio is spoken with a single predefined speaker and accent using a standard language; (2) without any background noise; (3) using high quality pronunciations with no disfluencies; and (4) synthesizing large amounts of data as needed for scaling to large corpora.

This document describes end-to-end speech-to-speech model that converts an input spectrogram directly to another spectrogram, without any intermediate symbolic representation. The model be trained to normalize any utterance from any speaker to a single predefined speaker's voice, preserving the linguistic content and projecting away non-linguistic content. In some implementations, the same model can be trained to successfully identify, separate, and reconstruct the loudest speaker in a mixture of overlapping speech, which improves ASR performance. In some instances, the model may translate speech in one language directly to speech in another language.

For a task where preserving speaker identify is the goal, one might leverage TTS synthesis to introduce variation in the target speaker identity, e.g. to match the original speaker, and control the speaking style or prosody directly. Such technologies could be used to synthesize training targets for a normalization model which maintains speaker identity, but enforces neutral prosody, or vice-versa, one which normalizes speaker identity, but maintains the prosody of the input speech.

Figure 6:
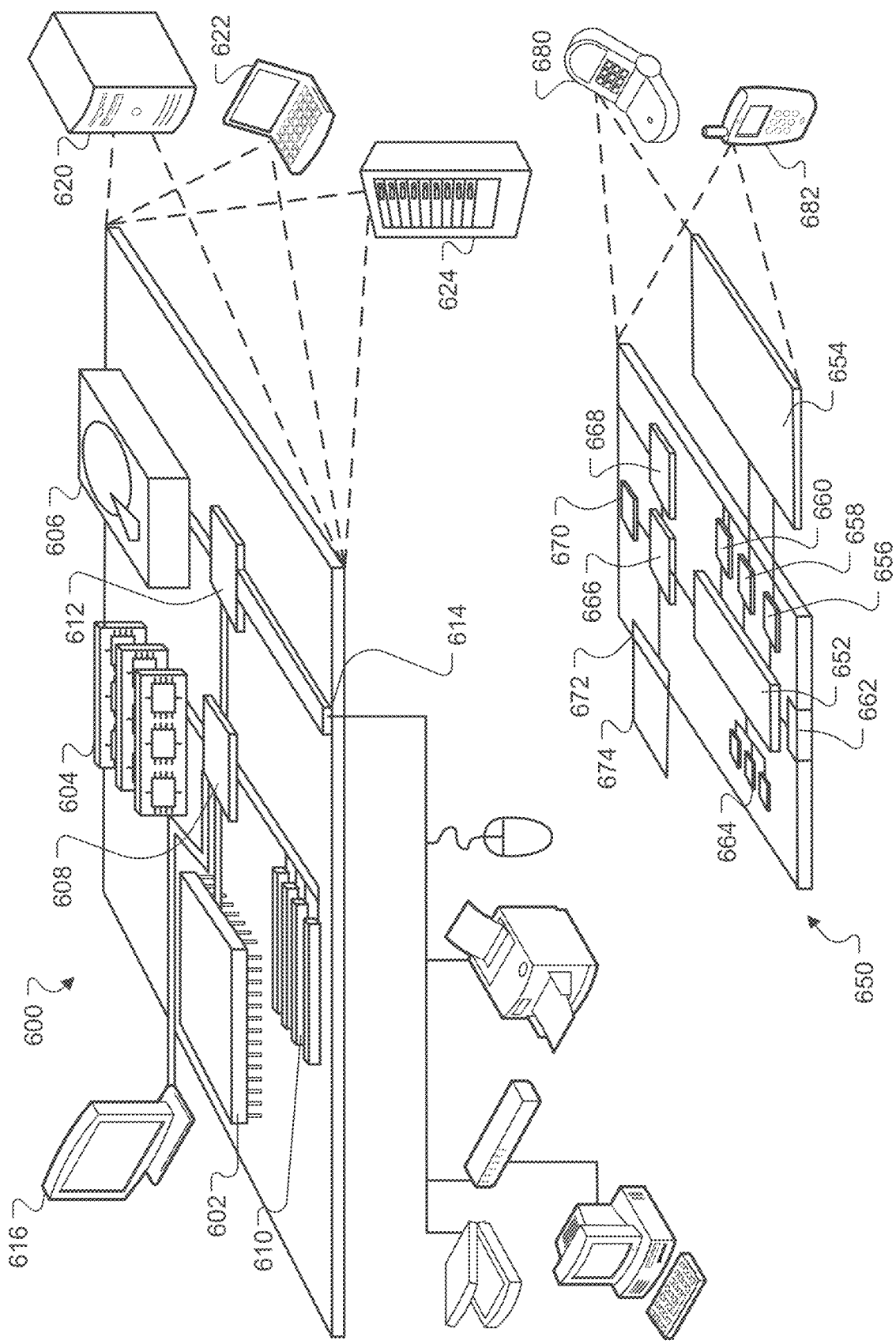
FIG. 6 is an example of a computing device and a mobile computing device.

FIG. 6 shows an example of a computing device 600 and a mobile computing device 650 that can be used to implement the techniques described here. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet. In some implementations, the systems and techniques described here can be implemented on an embedded system where speech recognition and other processing is performed directly on the device.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
receiving, by a computing device, first audio data of a first utterance of one or more terms spoken by a user, the one or more terms are spoken by the user with a first cadence;
providing, by the computing device, the first audio data as an input to a model that is configured to:
receive the first audio data; and
generate second audio data of a second utterance of the one or more terms spoken in a synthesized voice without performing speech recognition on the first audio data, the one or more terms spoken in the synthesized voice are with a second cadence different from the first cadence;
in response to providing the first audio data as an input to the model, receiving, by the computing device, the second audio data of the second utterance of the one or more terms spoken in the synthesized voice; and
providing, for output by the computing device, the second audio data of the second utterance of the one or more terms spoken in the synthesized voice,
wherein the model converts any input spectrogram directly to another spectrogram without any intermediate symbolic representation and is trained to normalize any utterance from any speaker to a single predefined synthesized voice that preserves linguistic content of the utterance and projects away non-linguistic content of the utterance by:
obtaining audio data characterizing a collection of utterances in a human voice and corresponding transcriptions of the utterances;
for each corresponding transcription of each utterance, processing, using a text to speech model, the corresponding transcription to generate synthesized audio characterizing the utterance in the single predefined synthesized voice; and
training the model to learn how to generate the synthesized audio characterizing each utterance in the single predefined synthesized voice as output from the audio data characterizing the corresponding utterance in the human voice provided as input to the model without performing speech recognition on the audio data characterizing the corresponding utterance in the human voice.

2. The method of claim 1, further comprising:
receiving, by the computing device, data indicating that a bot that is configured to conduct conversations with a given human is not configured to generate a response to a third utterance received from a human; and
based on receiving the data indicating that the bot is not configured to generate the response to the third utterance received from the human, transmitting, by the computing device and to a human operator, a request to respond to the third utterance received from the human,
wherein receiving the first audio data of the first utterance of the one or more terms spoken by the user comprises receiving the first audio data of the first utterance of the one or more terms spoken by the human operator in response to the third utterance.

3. The method of claim 1, wherein receiving the first audio data of the first utterance of the one or more terms spoken by the user comprises receiving the first audio data of the first utterance of the one or more terms spoken by the user while answering a telephone call.

4. The method of claim 1, further comprising:
receiving, by the computing device, third audio data of a third utterance of one or more third terms spoken by an additional user;
providing, by the computing device, the third audio data as an input to the model;
in response to providing the third audio data as an input to the model, receiving, by the computing device, fourth audio data of a fourth utterance of the one or more third terms spoken in the synthesized voice; and
providing, for output by the computing device, the fourth audio data of the fourth utterance of the one or more third terms spoken in the synthesized voice.

5. The method of claim 1, further comprising:
bypassing, by the computing device, obtaining a transcription of the first utterance.

6. The method of claim 1, wherein the model is configured to adjust a time period between each of the one or more terms.

7. The method of claim 1, wherein the model is configured to adjust a speaking time of each of the one or more terms.

8. A system comprising:
one or more computers; and
one or more storage devices storing instructions that are operable, when executed by the one or more computers, to cause the one or more computers to perform operations comprising:
receiving, by a computing device, first audio data of a first utterance of one or more terms spoken by a user, the one or more terms are spoken by the user with a first cadence;
providing, by the computing device, the first audio data as an input to a model that is configured to:
receive the first audio data; and
generate second audio data of a second utterance of the one or more terms spoken in a synthesized voice without performing speech recognition on the first audio data, the one or more terms spoken in the synthesized voice are with a second cadence different from the first cadence;

in response to providing the first audio data as an input to the model, receiving, by the computing device, the second audio data of the second utterance of the one or more terms spoken in the synthesized voice; and providing, for output by the computing device, the second audio data of the second utterance of the one or more terms spoken in the synthesized voice, wherein the model converts any input spectrogram directly to another spectrogram without any intermediate symbolic representation and is trained to normalize any utterance from any speaker to a single predefined synthesized voice that preserves linguistic content of the utterance and projects away non-linguistic content of the utterance by:

obtaining audio data characterizing a collection of utterances in a human voice and corresponding transcriptions of the utterances;

for each corresponding transcription of each utterance, processing, using a text to speech model, the corresponding transcription to generate synthesized audio characterizing the utterance in the single predefined synthesized voice; and training the model to learn how to generate the synthesized audio characterizing each utterance in the single predefined synthesized voice as output from the audio data characterizing the corresponding utterance in the human voice provided as input to the model without performing speech recognition on the audio data characterizing the corresponding utterance in the human voice.

9. The system of claim 8, wherein the operations further comprise:

receiving data indicating that a bot that is configured to conduct conversations with a given human is not configured to generate a response to a third utterance received from a human; and based on receiving the data indicating that the bot is not configured to generate the response to the third utterance received from the human, transmitting, to a human operator, a request to respond to the third utterance received from the human, wherein receiving the first audio data of the first utterance of the one or more terms spoken by the user comprises receiving the first audio data of the first utterance of the one or more terms spoken by the human operator in response to the third utterance.

10. The system of claim 8, wherein receiving the first audio data of the first utterance of the one or more terms spoken by the user comprises receiving the first audio data of the first utterance of the one or more terms spoken by the user while answering a telephone call.

11. The system of claim 8, wherein the operations further comprise:

receiving third audio data of a third utterance of one or more third terms spoken by an additional user;

providing the third audio data as an input to the model;

in response to providing the third audio data as an input to the model, receiving fourth audio data of a fourth utterance of the one or more third terms spoken in the synthesized voice; and providing, for output, the fourth audio data of the fourth utterance of the one or more third terms spoken in the synthesized voice.

12. The system of claim 8, wherein the operations further comprise bypassing obtaining a transcription of the first utterance.

13. The system of claim 8, wherein the model is configured to adjust a time period between each of the one or more terms.

14. The system of claim 8, wherein the model is configured to adjust a speaking time of each of the one or more terms.

* * * * *